(12) United States Patent
Li et al.

(10) Patent No.: US 12,262,338 B2
(45) Date of Patent: Mar. 25, 2025

(54) RADIO SYNCHRONIZATION

(71) Applicant: Nordic Semiconductor ASA, Trondheim (NO)

(72) Inventors: Wei Li, Trondheim (NO); Eivind Sjøgren Olsen, Trondheim (NO)

(73) Assignee: Nordic Semiconductor ASA, Trondheim (NO)

(*) Notice: Subject to any disclaimer, the term of this patent is extended or adjusted under 35 U.S.C. 154(b) by 438 days.

(21) Appl. No.: 17/865,185

(22) Filed: Jul. 14, 2022

(65) Prior Publication Data
US 2023/0031301 A1    Feb. 2, 2023

(30) Foreign Application Priority Data

Jul. 29, 2021 (GB) .................................... 2110906

(51) Int. Cl.
*H04L 7/00* (2006.01)
*H04W 56/00* (2009.01)

(52) U.S. Cl.
CPC ......... *H04W 56/001* (2013.01); *H04L 7/0087* (2013.01)

(58) Field of Classification Search
CPC .... H04W 56/001; H04W 4/80; H04L 7/0087; H04L 27/2656; H04L 45/74; H04L 7/0037; H04B 1/06; H04B 1/7075
USPC ................ 375/368, 362, 364, 365, 366, 343
See application file for complete search history.

(56) References Cited

U.S. PATENT DOCUMENTS

| | | | | |
|---|---|---|---|---|
| 6,791,960 | B1* | 9/2004 | Song ................... | H04B 1/7075 370/335 |
| 8,447,003 | B2* | 5/2013 | Tatsuta ............... | H04N 21/4305 375/376 |
| 10,079,705 | B1 | 9/2018 | Sharpe et al. | |
| 10,462,063 | B2* | 10/2019 | Gore .................... | H04L 45/74 |
| 2007/0147552 | A1 | 6/2007 | Olesen et al. | |

(Continued)

FOREIGN PATENT DOCUMENTS

| | | |
|---|---|---|
| EP | 2 259 525 A1 | 12/2010 |
| WO | WO 2015/038874 A1 | 3/2015 |

OTHER PUBLICATIONS

IPO Search Report under Section 17 for GB2110906.1, mailed Dec. 17, 2021, 4 pages.

(Continued)

*Primary Examiner* — Phuong Phu
(74) *Attorney, Agent, or Firm* — Klarquist Sparkman, LLP

(57) ABSTRACT

A radio receiver device determines whether a digital radio signal includes a predetermined cyclic preamble. An input portion samples the digital radio signal and generates a plurality of samples for storage in a buffer. A first autocorrelator correlates first and second subsets of the samples to generate a first correlation metric, the second subset having been stored in the buffer earlier than said first subset by an even integer multiple of half of the preamble period. A second autocorrelator correlates first and third subsets of the plurality of samples to generate a second correlation metric, the third subset having been stored in the buffer earlier than said first subset by an odd integer multiple of half of the preamble period. A processing portion calculates a difference between the correlation metrics and determines that the radio signal includes the predetermined cyclic preamble when the difference is greater than a threshold value.

20 Claims, 9 Drawing Sheets

(56) References Cited

U.S. PATENT DOCUMENTS

| | | |
|---|---|---|
| 2009/0028254 A1 | 1/2009 | Wang et al. |
| 2009/0304128 A1 | 12/2009 | Izumi et al. |
| 2015/0078172 A1* | 3/2015 | Chowdiah ........... H04L 27/2656 370/241 |
| 2016/0080138 A1* | 3/2016 | Biederman ........... H04L 7/0037 375/354 |
| 2018/0234358 A1* | 8/2018 | Jakubov .................. H04W 4/80 |
| 2018/0263001 A1* | 9/2018 | O'Brien .................. H04B 1/06 |
| 2019/0166573 A1* | 5/2019 | Moon ................. H04L 27/2656 |
| 2019/0191374 A1* | 6/2019 | Murali .................... H04W 4/80 |

OTHER PUBLICATIONS

Extended European Search Report for European Application No. 22184664.5, dated Dec. 22, 2022, 9 pages.

* cited by examiner

RADIO SYNCHRONIZATION

CROSS-REFERENCE TO RELATED APPLICATION

This application claims priority from Great Britain Application No. 2110906.1, filed Jul. 29, 2021, which application is incorporated herein by reference in its entirety.

TECHNICAL FIELD

The present invention relates to a radio receiver, particularly though not exclusively a Bluetooth® Low Energy Long Range receiver, that provides an improved ability to detect a synchronization portion of a received data signal.

BACKGROUND

Many modern electronic devices include one or more radio transceivers, receivers, or transmitters for carrying out wireless communication with other devices. There are a number of wireless communication protocols, known in the art per se, for carrying out such communications, including Bluetooth®, Bluetooth Low Energy®, Wi-Fi®, and ZigBee®.

In accordance with at least some wireless communication protocols, a radio receiver generally looks for a certain preamble or 'synchronization word' (i.e. a portion of a received data signal on a frequency monitored by the receiver). This synchronization word is typically a signal pattern that is known to the receiver a priori, which helps the receiver to perform frequency synchronization, automatic gain control (AGC) training, and symbol timing estimation.

In order to detect this preamble, some conventional radio receivers commonly use an autocorrelator that correlates samples of incoming signals to the expected preamble signal pattern. When the autocorrelator finds a plateau, the radio receiver determines that the preamble region has been detected. This is generally achieved using a multi-peak detector and comparing the strength of the received peaks to a threshold value to determine whether the preamble has been detected. Once the preamble is detected, the 'synchronization engine' of the receiver moves to the next stage, which may involve frame synchronization.

However, the Applicant has appreciated that interference from other sources, e.g. other transmitters, can cause significant issues with this synchronization process. In particular, if an interfering transmitter (e.g. another Bluetooth Low Energy® coded transmitter) is transmitting a strong constant carrier signal, the autocorrelator may incorrectly determine that a valid preamble has been detected, triggering the synchronization engine into the next stage. These false positive results can result in the receiver becoming 'locked up' trying to perform the synchronization process on invalid signals. During this time, the receiver is effectively 'blind' to signals that it should have otherwise locked on because the receiver is busy trying to find a match on the expected access address field (that is not actually there). Generally, the receiver will be locked up until a timeout occurs or some other check fails.

There is a test case in the Bluetooth® 'RF_PHY' spec which requires testing with such an interferer constantly sending random data in the channel of interest. In such a test, the data is pattern mapped the same way as in the sync word, which is pattern mapped as a sequence formed from ten repetitions of '01'. Thus segments close to the actual sync word may, with high probability, appear in interferer data.

The Applicant has appreciated that the issue above is particularly problematic when communicating at the limits of the receiver's sensitivity, for example when operating in relatively low signal-to-noise ratio (SNR) conditions. Radio receivers operating in accordance with the Bluetooth Low Energy® 'Long Range' (referred to interchangeably herein as 'BLE Long Range' or simply 'BLE LR') mode are expected to operate under very low SNR conditions. In order to achieve this, the receiver may use a relatively low threshold for the peak comparison to ensure the preamble is detected, however this comes at the cost of more false positives because the receiver is more susceptible to noise and interference, i.e. detecting false positives due to a constant carrier.

The Applicant has appreciated that it would be advantageous to avoid these issues.

SUMMARY

When viewed from a first aspect, embodiments of the present invention provide a radio receiver device configured to receive a digital radio signal and to determine whether said digital radio signal includes a predetermined cyclic preamble having a period, the radio receiver device comprising:
  an input portion configured to sample the received digital radio signal and to generate therefrom a plurality of samples;
  a buffer configured to store the plurality of samples;
  a first autocorrelator configured to correlate a first subset of the plurality of samples with a second subset of the plurality of samples to generate a first correlation metric, said second subset of samples having been stored in the buffer earlier than said first subset of samples by a first delay equal to an even integer multiple of half of the preamble period;
  a second autocorrelator configured to correlate the first subset of the plurality of samples with a third subset of the plurality of samples to generate a second correlation metric, said third subset of samples having been stored in the buffer earlier than said first subset of samples by a second delay equal to an odd integer multiple of half of the preamble period; and
  a processing portion configured to calculate a difference between the first and second correlation metrics and to determine that the radio signal includes the predetermined cyclic preamble when said difference is greater than a threshold value.

This first aspect extends to a method of determining whether a received digital radio signal includes a predetermined cyclic preamble having a period, the method comprising:
  receiving a digital radio signal;
  sampling the received digital radio signal to generate therefrom a plurality of samples;
  storing the plurality of samples;
  autocorrelating a first subset of the plurality of samples with a second subset of the plurality of samples to generate a first correlation metric, said second subset of samples having been stored earlier than said first subset of samples by a first delay equal to an even integer multiple of half of the preamble period;
  autocorrelating the first subset of the plurality of samples with a third subset of the plurality of samples to generate a second correlation metric, said third subset of samples having been stored earlier than said first subset of samples by a second delay equal to an odd integer multiple of half of the preamble period;

calculating a difference between the first and second correlation metrics; and determining that the radio signal includes the predetermined cyclic preamble when said difference is greater than a threshold value.

The first aspect also extends to a non-transitory computer-readable medium comprising instructions that, when executed by a processor, cause the processor to carry out a method of determining whether a received digital radio signal includes a predetermined cyclic preamble having a period, the method comprising:

receiving a digital radio signal;

sampling the received digital radio signal to generate therefrom a plurality of samples;

storing the plurality of samples;

autocorrelating a first subset of the plurality of samples with a second subset of the plurality of samples to generate a first correlation metric, said second subset of samples having been stored earlier than said first subset of samples by a first delay equal to an even integer multiple of half of the preamble period;

autocorrelating the first subset of the plurality of samples with a third subset of the plurality of samples to generate a second correlation metric, said third subset of samples having been stored earlier than said first subset of samples by a second delay equal to an odd integer multiple of half of the preamble period;

calculating a difference between the first and second correlation metrics; and determining that the radio signal includes the predetermined cyclic preamble when said difference is greater than a threshold value.

The first aspect also extends to a computer software product comprising instructions that, when executed by a processor, cause the processor to carry out a method of determining whether a received digital radio signal includes a predetermined cyclic preamble having a period, the method comprising:

receiving a digital radio signal;

sampling the received digital radio signal to generate therefrom a plurality of samples;

storing the plurality of samples;

autocorrelating a first subset of the plurality of samples with a second subset of the plurality of samples to generate a first correlation metric, said second subset of samples having been stored earlier than said first subset of samples by a first delay equal to an even integer multiple of half of the preamble period;

autocorrelating the first subset of the plurality of samples with a third subset of the plurality of samples to generate a second correlation metric, said third subset of samples having been stored earlier than said first subset of samples by a second delay equal to an odd integer multiple of half of the preamble period;

calculating a difference between the first and second correlation metrics; and determining that the radio signal includes the predetermined cyclic preamble when said difference is greater than a threshold value.

Thus it will be appreciated that embodiments of the present invention provide an improved arrangement in which the cyclic nature of the preamble can be exploited. The first autocorrelator provides 'constructive' correlation (so-named with reference to constructive interference) because if the preamble is present, then correlating a subset of the samples with a version of those same samples delayed by the period of the cycle (or some integer multiple of the period) should provide high correlation. The second autocorrelator provides 'destructive' correlation (so-named with reference to destructive interference) because if the preamble is present, then correlating a subset of the samples with a version of those same samples delayed by half the period (or any integer-and-a-half periods) should provide low correlation. The larger the difference between these two correlation metrics (i.e. the first minus the second), the more confident a determination can be made that the received signal includes the preamble. This arrangement may provide significant improvements to the receiver's co-channel interference rejection capabilities.

While the difference between the outputs of the first and second autocorrelators may be significant for many different preamble patterns, embodiments of the present invention work particularly well when the cyclic preamble is symmetric about its midpoint (i.e. it is 'palindromic') and has the same number of 0 s as 1 s. In other words, the arrangement is particular beneficial when the first half of the preamble is the inverse of the second half of the preamble. For example, the BLE LR specification outlines the use of the sequence [00111100] as the sync word. This byte, if broken into two halves, has a first half, [0011], that is the logical inverse of the second half, [1100]. Thus when this BLE LR sync word is correlated with a version of itself delayed by its period (i.e. an even multiple of half-periods), a high correlation metric will be achieved, ideally 100% correlation; but when correlated with a version of itself delayed by half its period (or an odd multiple of half-periods), a low correlation metric will be achieved, ideally 0% correlation. Thus in some embodiments, the cyclic preamble is [00111100].

In some embodiments, the radio receiver device is configured to operate in accordance with a Bluetooth Low Energy protocol. Preferably the radio receiver device is configured to operate in accordance with the Long Range mode of the Bluetooth Low Energy protocol. It will be appreciated that a typical BLE LR packet comprises a preamble field, coded access address field, coding indicator field, protocol data unit (PDU) field, cyclic redundancy check (CRC) field, and terminator (TERM) field. The preamble field of a BLE LR packet is 80 μs long, consisting of ten repetitions of the sync word sequence [00111100] used for reaching initial frame synchronisation in low sensitivity conditions.

Those skilled in the art will appreciate that the radio receiver may comprise a number of further components typical of a radio reception chain, e.g. filters, digital signal processors, microcontrollers, etc. In some embodiments, the radio receiver further comprises a demodulator configured to demodulate the received digital radio signal. The demodulator may comprise a peak detector. In a set of such embodiments, the radio receiver is configured to enable the demodulator only when the processing portion determines that the digital radio signal comprises the cyclic preamble. Thus the radio receiver may be arranged to demodulate signals that are determined to contain the preamble. Advantageously, the demodulator is less susceptible to becoming 'locked up' due to a false positive detection of a preamble, because the radio receiver is less likely to produce such false positives than a conventional receiver, known in the art per se. When not enabled, the demodulator may be switched off or operated in a low power mode, thereby providing power savings. Similarly, processing overheads may be reduced by only processing those signals that the receiver is confident contain the preamble.

The demodulator may be configured to carry out symbol timing recovery and frequency offset correction. The demodulator may also, additionally or alternative, be configured to carry out frame synchronization. The demodulator may comprise a Viterbi decoder.

The difference between the first and second correlation metrics may be used directly. However, in some embodiments, the difference is filtered using a low-pass filter before the determination of whether the digital radio signal comprises the preamble is made. This filter may advantageous suppress noise, such that the time-average of the difference must exceed the threshold value in order for the device to determine the preamble is present. Such a filter may also act to supress shorter pattern mapped '0101' sequences from other, interfering transmitters of the type outlined previously.

As outlined above, the processing portion calculates the difference between the first and second correlation metrics and determines that the radio signal includes the predetermined cyclic preamble when the difference is greater than the threshold value. The threshold value may, in some embodiments, be a predetermined value. The threshold value may be fixed, or it may be configurable, e.g. during device initialisation or during a design phase or testing phase. For example, the threshold may be set based on simulated or experimental data, by making a trade off of receiver sensitivity against susceptibility to false positives.

Those skilled in the art will appreciate that, in accordance with some protocols (e.g. BLE), the radio receiver device may be configured to perform resynchronization, where it is expected to drop its current synchronization in favour of another—typically stronger—channel. In some embodiments, the radio receiver device is configured to increase the threshold value once synchronization has been performed. In a set of such embodiments, the threshold value is increased to a value dependent on the difference calculated by the processing portion for the received radio signal for which synchronization was performed.

The correlation metrics may simply be the outputs of the respective autocorrelators. However, the Applicant has appreciated that it may be advantageous in some scenarios to normalise the power of the received radio signals to account for changes in transmission power and/or attenuation of the received signals. In some embodiments, the processing portion is configured to:
  determine a respective power of each of the first, second, and third subsets;
  determine a respective power of an output of each of the first and second autocorrelators;
  divide the power of the output of the first autocorrelator by the product of the respective powers of the first and second subsets to generate a first ratio; and divide the power of the output of the second autocorrelator by the product of the respective powers of the first and third subsets to generate a second ratio. In accordance with such embodiments, the first and second correlation metrics may be derived from the first and second ratios respectively. In a particular set of embodiments, the first and second correlation metrics are the first and second ratios respectively.

The principles outlined above make use of a period and half-period delay for the first and second autocorrelators to ensure the constructive and destructive correlation respectively when the preamble is present. However, the Applicant has appreciated that for other patterns, the same effect may be achieved with a different autocorrelator delay, and in particular with a different delay for the second autocorrelator. For example, if the cyclic preamble were [00110011], constructive correlation will be achieved by correlating the samples with a version of itself delayed by a whole preamble period as before, whereas destructive correlation will be achieved by correlating the samples with a version of itself delayed by a quarter period (or an odd integer multiple of quarter-periods). Other cyclic preamble patterns, or preamble patterns having symmetry about their middle, may also be used with the principles of the present invention, through suitable selection of the delays used for each autocorrelation process (i.e. to make use of constructive and destructive correlation).

Thus, when viewed from a second aspect, embodiments of the present invention provide a radio receiver device configured to receive a digital radio signal and to determine whether said digital radio signal includes a predetermined cyclic preamble having a period, the radio receiver device comprising:
  an input portion configured to sample the received digital radio signal and to generate therefrom a plurality of samples;
  a buffer configured to store the plurality of samples;
  a first autocorrelator configured to correlate a first subset of the plurality of samples with a second subset of the plurality of samples to generate a first correlation metric, said second subset of samples having been stored in the buffer earlier than said first subset of samples by a first delay, said first delay being selected such that, when the preamble is present, the first autocorrelator correlates a first copy of said preamble with a second copy of said preamble;
  a second autocorrelator configured to correlate the first subset of the plurality of samples with a third subset of the plurality of samples to generate a second correlation metric, said third subset of samples having been stored in the buffer earlier than said first subset of samples by a second delay different to said first delay, said second delay being selected such that, when the preamble is present, the second autocorrelator correlates the first copy of said preamble with an inverted copy of said preamble; and
  a processing portion configured to calculate a difference between the first and second correlation metrics and to determine that the radio signal includes the predetermined cyclic preamble when said difference is greater than a threshold value.

This second aspect extends to a method of determining whether a received digital radio signal includes a predetermined cyclic preamble having a period, the method comprising:
  receiving a digital radio signal;
  sampling the received digital radio signal to generate therefrom a plurality of samples;
  storing the plurality of samples;
  autocorrelating a first subset of the plurality of samples with a second subset of the plurality of samples to generate a first correlation metric, said second subset of samples having been stored earlier than said first subset of samples by a first delay, said first delay being selected such that, when the preamble is present, said autocorrelating of the first subset with the second subset comprises correlating a first copy of said preamble with a second copy of said preamble;
  autocorrelating the first subset of the plurality of samples with a third subset of the plurality of samples to generate a second correlation metric, said third subset of samples having been stored earlier than said first subset of samples by a second delay different to said first delay, said second delay being selected such that, when the preamble is present, said autocorrelating of the first subset with the third subset comprises correlating the first copy of said preamble with an inverted copy of said preamble;

calculating a difference between the first and second correlation metrics; and determining that the radio signal includes the predetermined cyclic preamble when said difference is greater than a threshold value.

The second aspect also extends to a non-transitory computer-readable medium comprising instructions that, when executed by a processor, cause the processor to carry out a method of determining whether a received digital radio signal includes a predetermined cyclic preamble having a period, the method comprising:

receiving a digital radio signal;

sampling the received digital radio signal to generate therefrom a plurality of samples;

storing the plurality of samples;

autocorrelating a first subset of the plurality of samples with a second subset of the plurality of samples to generate a first correlation metric, said second subset of samples having been stored earlier than said first subset of samples by a first delay, said first delay being selected such that, when the preamble is present, said autocorrelating of the first subset with the second subset comprises correlating a first copy of said preamble with a second copy of said preamble;

autocorrelating the first subset of the plurality of samples with a third subset of the plurality of samples to generate a second correlation metric, said third subset of samples having been stored earlier than said first subset of samples by a second delay different to said first delay, said second delay being selected such that, when the preamble is present, said autocorrelating of the first subset with the third subset comprises correlating the first copy of said preamble with an inverted copy of said preamble;

calculating a difference between the first and second correlation metrics; and determining that the radio signal includes the predetermined cyclic preamble when said difference is greater than a threshold value.

The second aspect also extends to a computer software product comprising instructions that, when executed by a processor, cause the processor to carry out a method of determining whether a received digital radio signal includes a predetermined cyclic preamble having a period, the method comprising:

receiving a digital radio signal;

sampling the received digital radio signal to generate therefrom a plurality of samples;

storing the plurality of samples;

autocorrelating a first subset of the plurality of samples with a second subset of the plurality of samples to generate a first correlation metric, said second subset of samples having been stored earlier than said first subset of samples by a first delay, said first delay being selected such that, when the preamble is present, said autocorrelating of the first subset with the second subset comprises correlating a first copy of said preamble with a second copy of said preamble;

autocorrelating the first subset of the plurality of samples with a third subset of the plurality of samples to generate a second correlation metric, said third subset of samples having been stored earlier than said first subset of samples by a second delay different to said first delay, said second delay being selected such that, when the preamble is present, said autocorrelating of the first subset with the third subset comprises correlating the first copy of said preamble with an inverted copy of said preamble;

calculating a difference between the first and second correlation metrics; and determining that the radio signal includes the predetermined cyclic preamble when said difference is greater than a threshold value.

BRIEF DESCRIPTION OF DRAWINGS

Certain embodiments of the invention will now be described, by way of non-limiting example only, with reference to the accompanying drawings in which.

DETAILED DESCRIPTION

Figure 1:
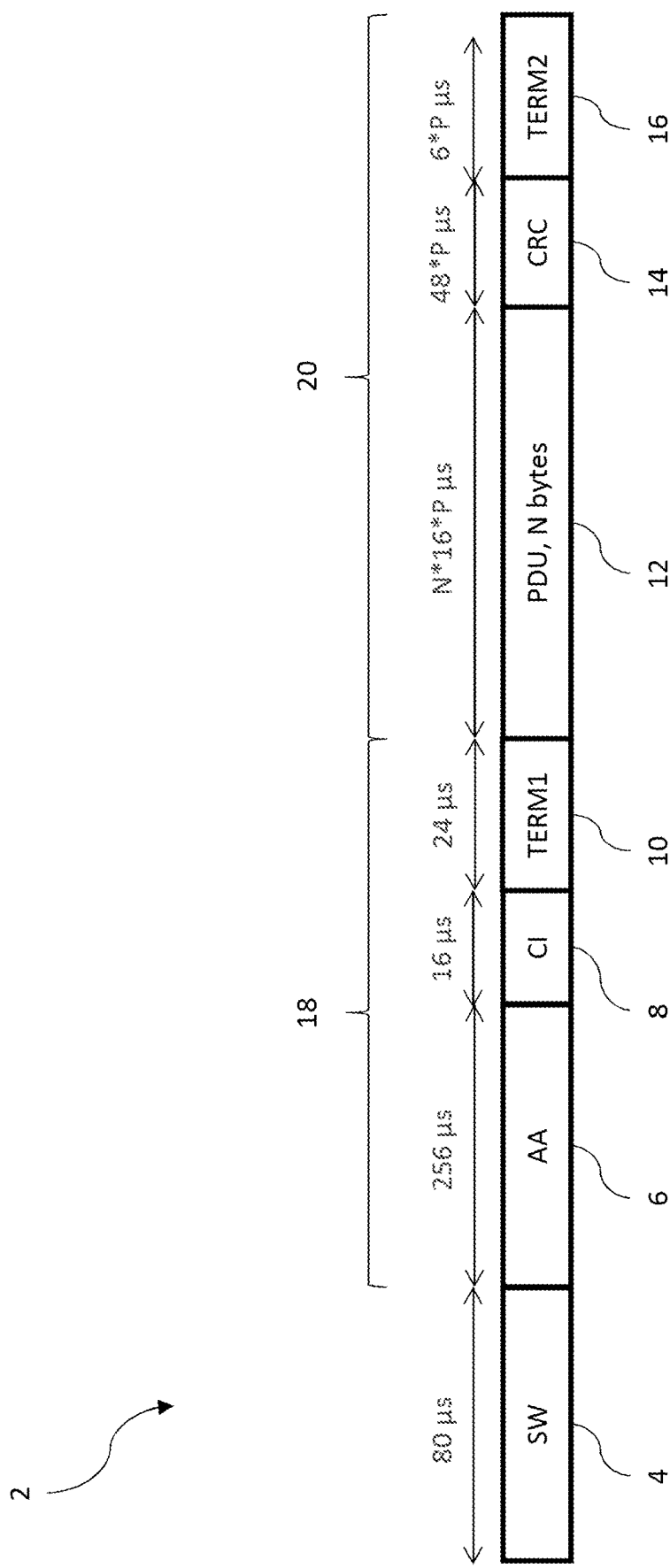
FIG. 1 is a block diagram illustrating the format of a BLE LR packet.

FIG. 1 is a block diagram illustrating the format of a BLE LR packet 2. The BLE LR packet 2 comprises: an 80 µs sync word (SW) preamble field 4, a 256 µs coded access address (AA) field 6, a 16 µs coding indicator (CI) field 8, a 24 µs first terminator (TERM1) field 10, an N*16*P µs protocol data unit (PDU) field 12, a 48*P µs cyclic redundancy check (CRC) field 14, and a 6*P µs second terminator (TERM2) field 16.

The AA field 6, CI field 8, and TERM1 field 10 collectively form a first FEC block 18.

The PDU field 12, CRC field 14, and TERM2 field 16 collectively form a second FEC block 20.

The SW field 4 of the BLE LR packet 2 is a 80 µs long preamble portion, consisting of ten repetitions of the sync word sequence [00111100] used for reaching initial frame synchronisation in low sensitivity conditions.

Figure 2:
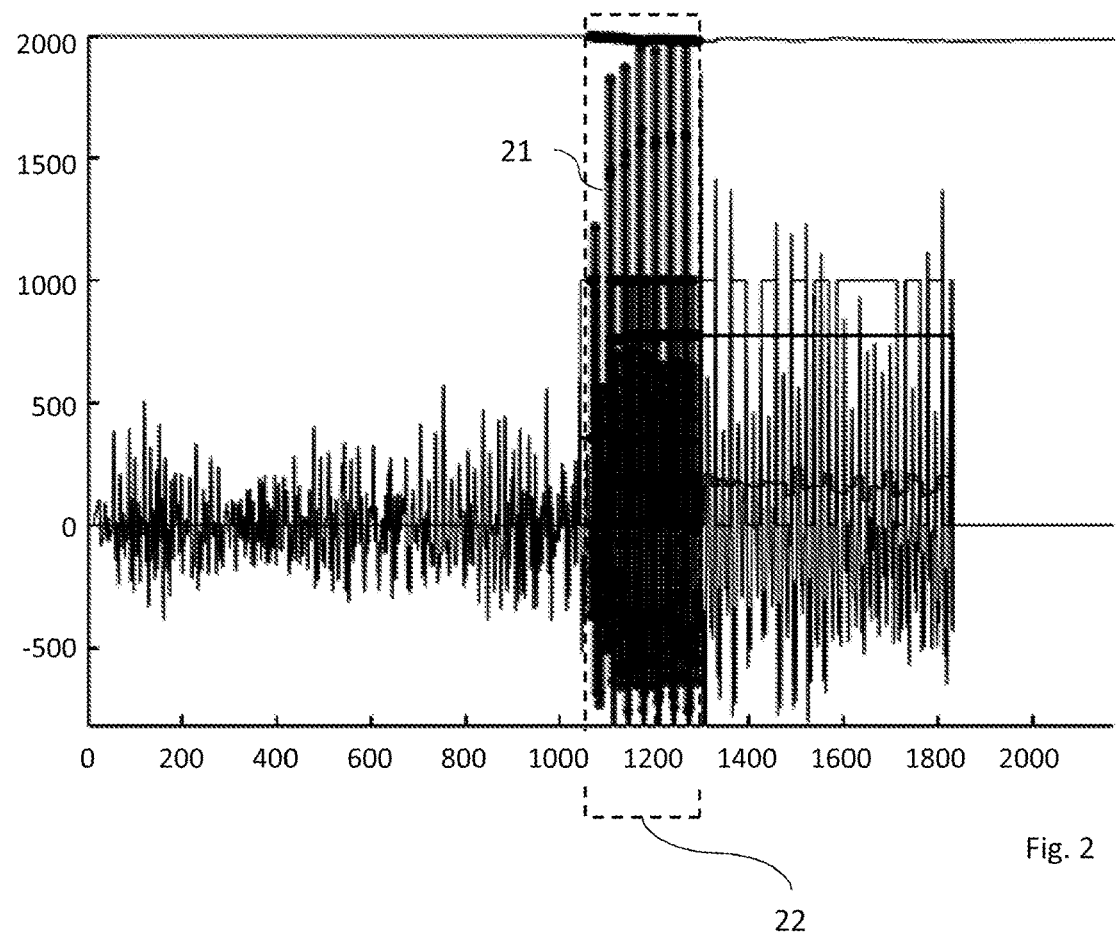
FIG. 2 is a plot of a correlator response under good SNR conditions.

FIG. 2 is a plot of a correlator response under good SNR conditions. FIG. 2 shows what the output of a conventional decoder in a prior art radio receiver looks like under good (−90 dBm) SNR conditions.

The highlighted area 21 in the SW region 22 shows the location of the actual SW field 4. Frame synchronization (FRS) is achieved at the end of this sequence, where the frame synchronisation process looks for a match. The word to be matched is called the frameSynch word (FW).

It can be readily seen from FIG. 2 that the peaks in the SW region 22 (i.e. the period of time corresponding to the SW preamble field 4) are much stronger than the peaks following immediately prior which correspond to noise responses; and are also stronger than the peaks that follow afterwards which are due to the spreading pattern not matching multiple [00111100] sequences. Thus if the peak requirements are set high enough, there is little danger of locking synchronisation too early on noise (i.e. a false positive), and thus being unable to correctly synchronise to the beginning of the actual packet 2.

Figure 3:
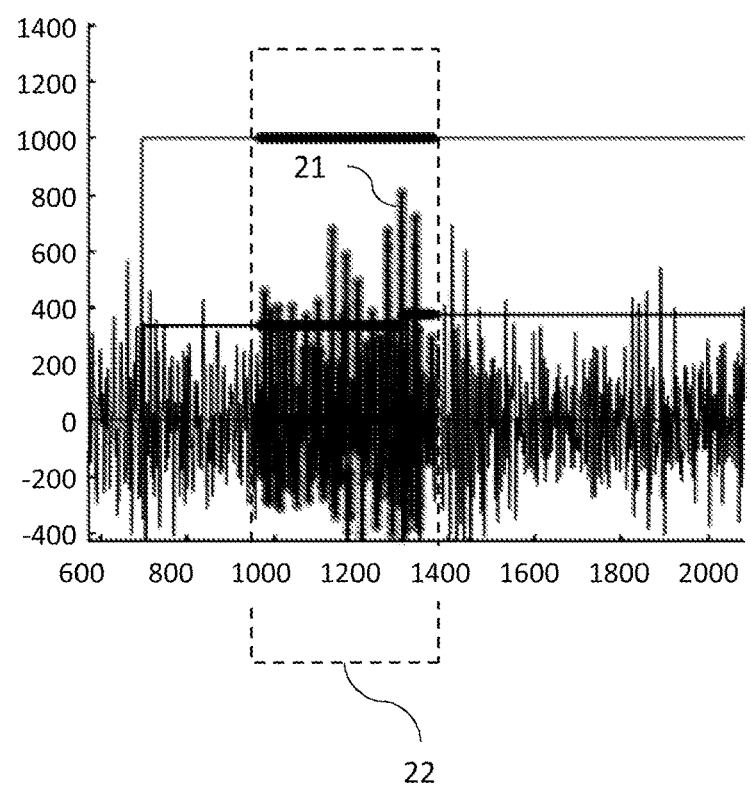
FIG. 3 is a plot of a correlator response under poor SNR conditions.

Conversely, however, FIG. 3 provides a plot of a correlator response under poor SNR conditions (−105 dBm). Here, the distortion is now sufficiently heavy that the magnitude of peaks in the SW region 22 are reduced down towards the magnitude of peaks arising from noise. In order to still be able to detect the packet 2, the peak requirements must be reduced. However, this increases the likelihood of synchronising early on noise (i.e. a false positive). In this corner, significant distortion is experienced such that the SW peaks can no longer be trusted to be higher than the noise peaks nor the peaks produced in the FW portion of the packet 2.

Figure 4:
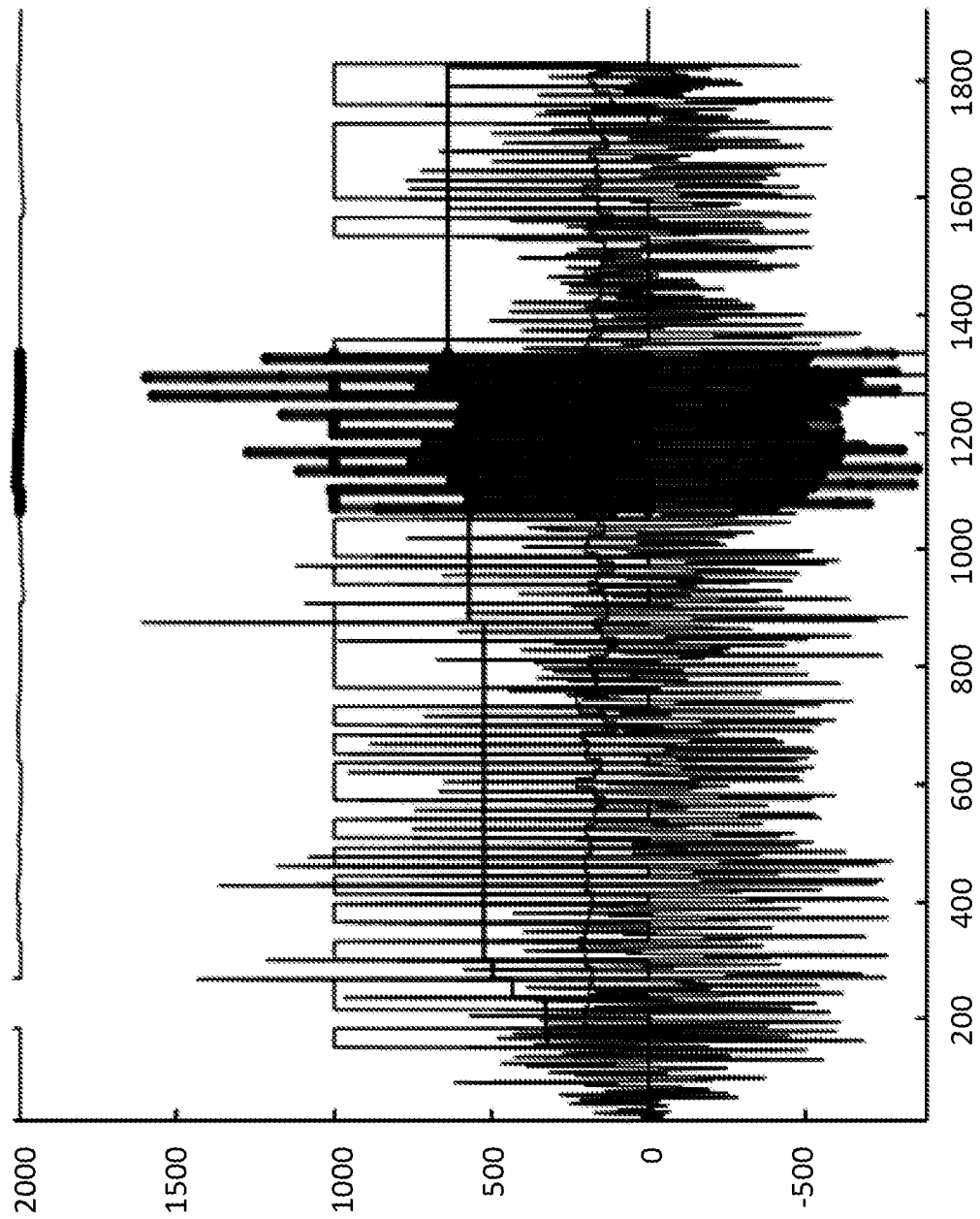
FIG. 4 is a plot of a correlator response in the presence of a heavy co-channel interference source.

FIG. 4 is a plot of a correlator response in the presence of a heavy co-channel interference source. FIG. 4 shows the situation when a heavy S8 interferer is in the channel. Even though the source of interference is not sending multiple [00111100] patterns back to back, it nevertheless produces decoder peaks that are much stronger than an actual SW would be at poor SNR conditions. If a single synchronization threshold is to be used, a trade off must be made between selectivity and sensitivity.

Figure 5:
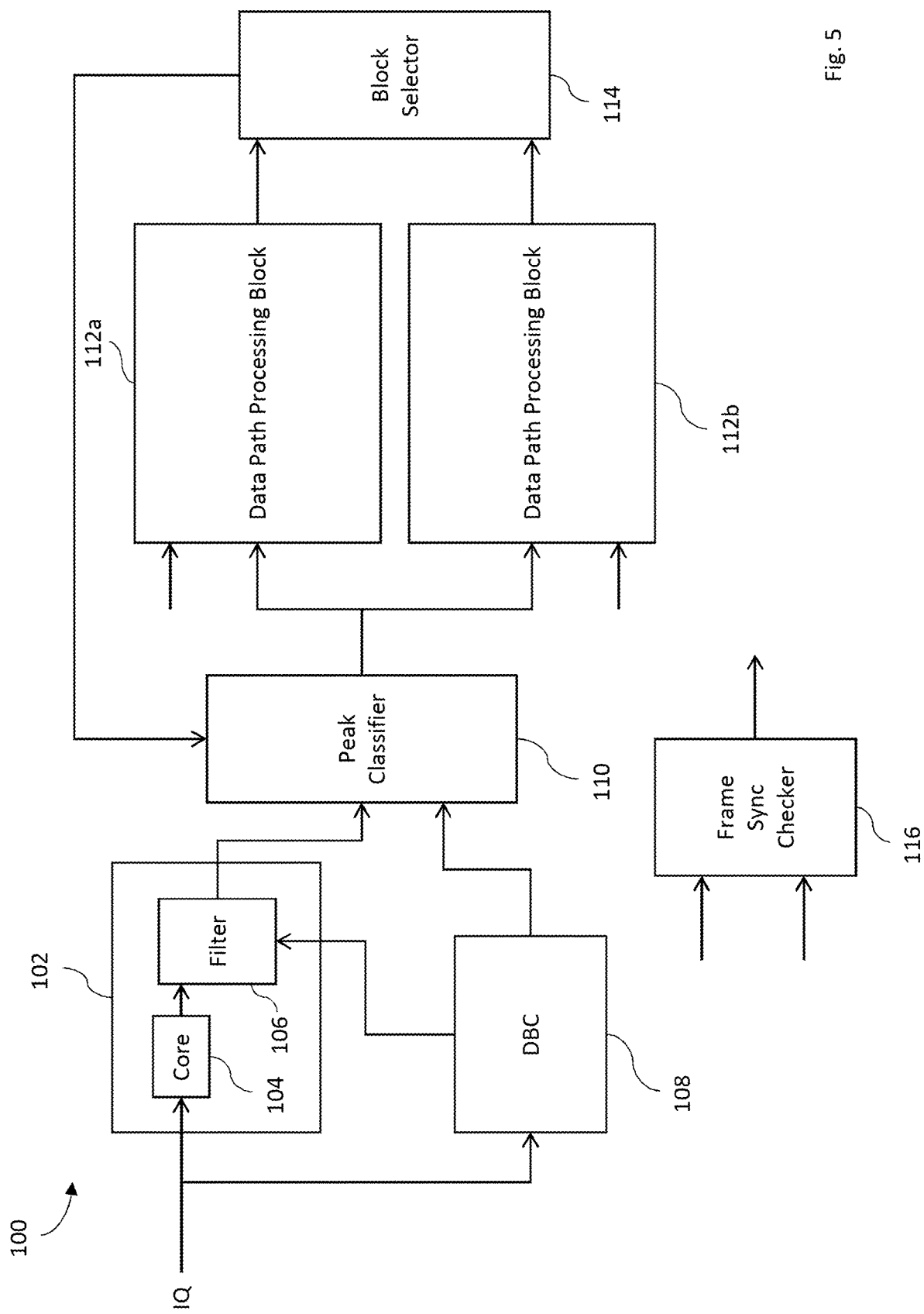
FIG. 5 is a block diagram of a radio receiver device in accordance with an embodiment of the present invention.

FIG. 5 is a block diagram of a radio receiver device 100 in accordance with an embodiment of the present invention. The radio receiver device 100 comprises a preamble recognition module 102, which deals with all calculations related to the autocorrelation for recognising the SW 4 in the BLE LR data packet 2 described previously. This preamble recognition module 102 comprises a core 104 and a filter 106, which will be explained in further detail later.

The device 100 also includes: a double correlator (DBC) 108; a peak classifier 110; two data path processing blocks 112a, 112b; a block selector 114; and a frame sync checker 116.

The DBC 108 includes logic for performing various functions including automatic gain control (AGC) training and symbol timing estimation, as well as finite state machine (FSM) logic.

The peak classifier 110 is a decision maker which evaluates the received peak chain from the DBC 108 and decides whether it is a strong peak chain or weak peak chain. When a strong peak is seen, the peak classifier 110 starts or restarts a specified data path processing block 112a, 112b for receiving data. When seeing a weak peak, the peak classifier 110 tells all blocks to decay their thresholds, as explained in more detail later. The block selector 114 is configured to decide which block 112a, 112b shall respond to a strong peak event.

The frame sync checker 116 handles all frame sync signals from the data path processing blocks 112a, 112b. As soon as receiving a frame sync from one of these block 112a, 112b, it keeps that block alive but disables and resets the other block. If multiple frame sync signals arrive simultaneously, it may pick the one with the lowest index.

In general, 'late' re-syncs can cause issues with frame synchronisation and/or frequency offset estimates. This generally sets a lower bound on how relaxed the thresholds can be set.

Figure 6:
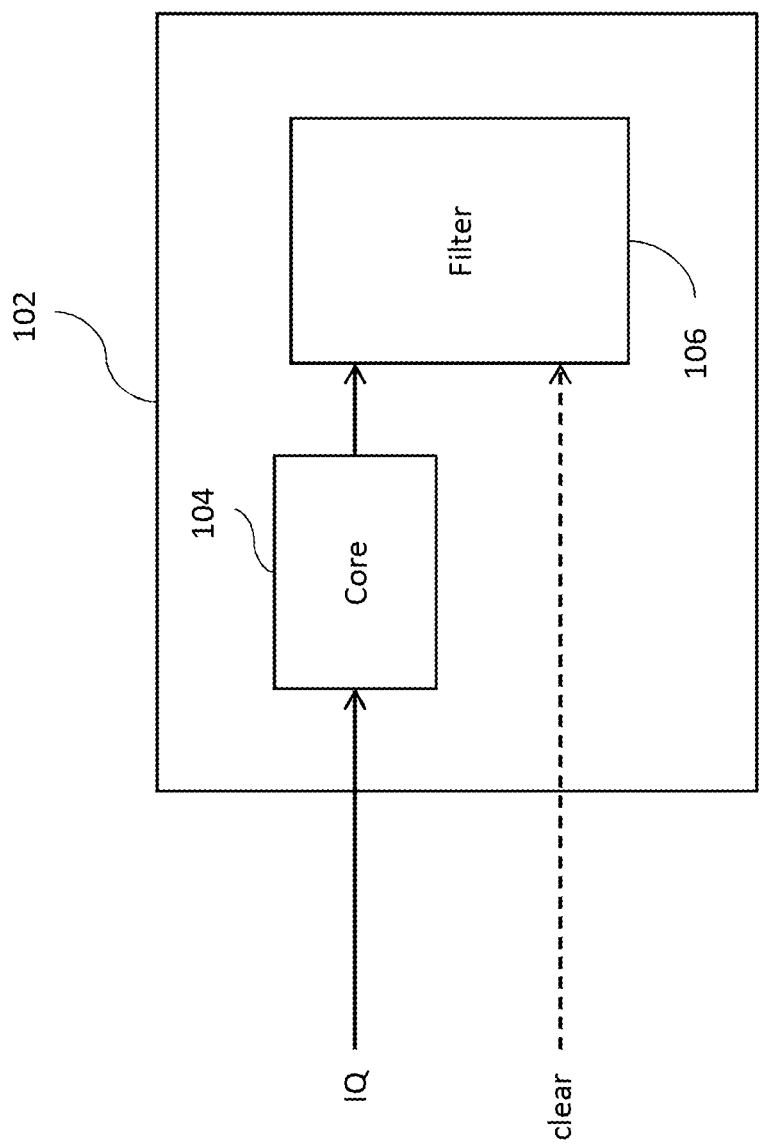
FIG. 6 is a block diagram of the preamble recognition module in the device of FIG. 5.

FIG. 6 is a block diagram of the preamble recognition module 102 in the device of FIG. 5, and shows the core 104 and the filter 106 which acts to smooth the output from the core 104. The preamble recognition module 102 is responsible for detecting the start of the packet 2, i.e. for detecting the SW 4. In some conventional receivers, known in the art per se, the DBC 108 would be responsible for this function, rather than having a dedicated module as provided by embodiments of the present invention.

Thus the main task of the preamble recognition module 102 is to recognise the preamble period of a BLE LR packet, and to reduce the likelihood of erroneous synchronisation to noise or a constant carrier signal in front of valid data, and re-synching on bit patterns occurring in the FRS region.

Figure 7:
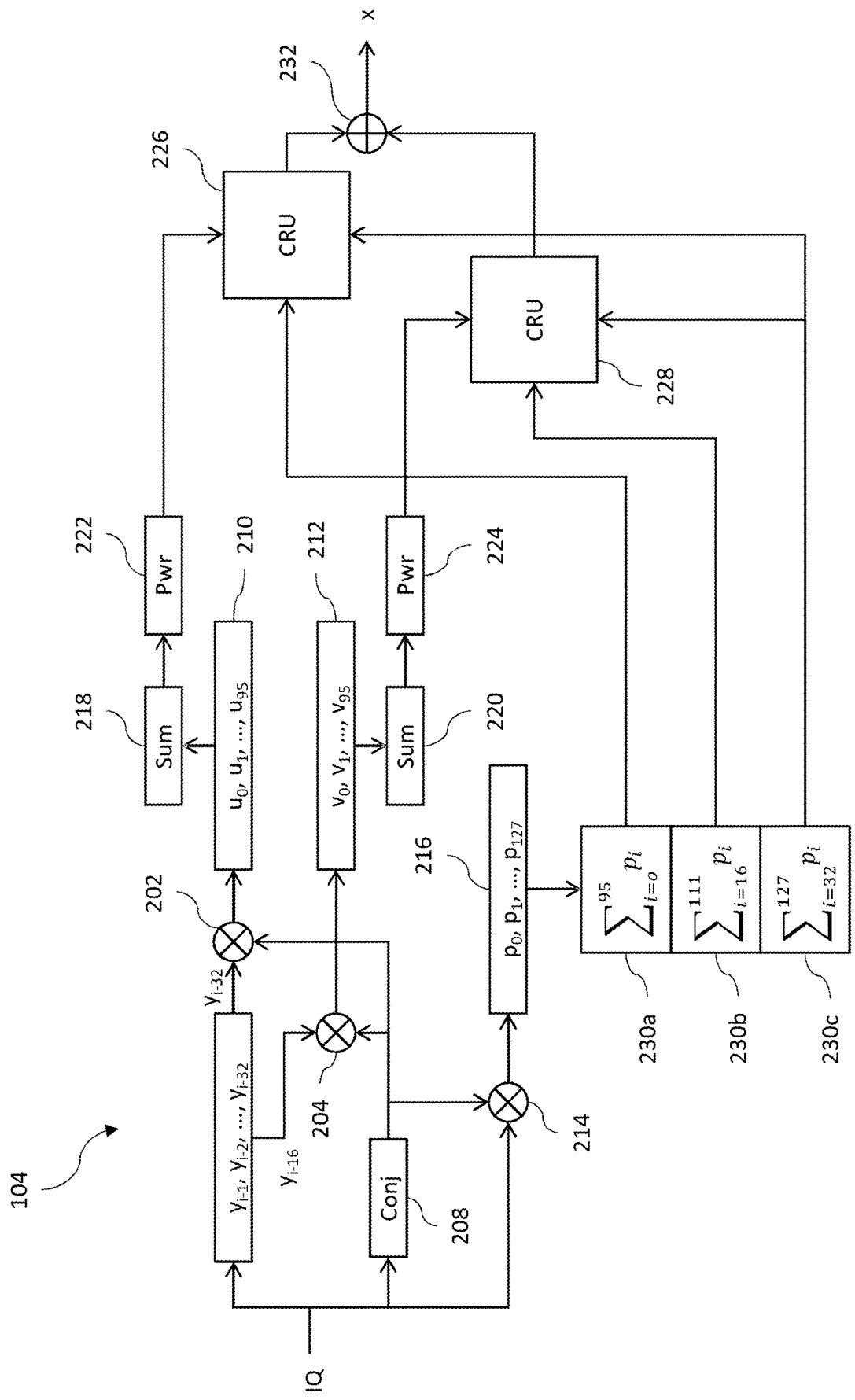
FIG. 7 is a block diagram of the core of FIG. 6.

FIG. 7 is a block diagram of the core 104 of FIG. 6. The core 104 includes two autocorrelators 202, 204 which receive samples of the input IQ signal. The latest 32 samples $y_{i-1}, y_{i-2}, \ldots y_{i-32}$ of the IQ signal are stored in a 32-bit shift register 206. The arrangement is configured such that 32 samples corresponds to an entire period of the preamble portion, i.e. the SW 4. It will of course be appreciated that a different sampling rate could be used, and a different sized shift register could be used accordingly.

The first autocorrelator 202 receives the sample from 32 samples ago, i.e. $y_{i-32}$, and the current sample of the IQ signal, subject to a conjugate function 208. Thus the first autocorrelator 202 correlates the IQ signal with itself from one period ago. Using the BLE LR preamble pattern of [00111100], it would be expected that, if the preamble is present, this autocorrelator 202 would output a high correlation value.

The output of the correlation is stored in a shift register 210 that stores the latest 96 outputs (i.e. the latest 96 calculations of $y_{t-32}y_t^*$) $u_0$ to $u_{95}$ from the first autocorrelator 202.

The second autocorrelator 204 receives the sample from 16 samples ago, i.e. $y_{i-16}$, and the current sample of the IQ signal, subject to the conjugate function 208. Thus the second autocorrelator 204 correlates the IQ signal with itself from half a period ago. Using the BLE LR preamble pattern of [00111100], it would be expected that, if the preamble is present, this autocorrelator 202 would output a low correlation value. The output of the correlation is stored in a further shift register 212 that stores the latest 96 outputs (i.e. the latest 96 calculations of $y_{t-16}y_t^*$) $v_0$ to $v_{95}$ from the second autocorrelator 204.

A further correlator 214 is configured to correlate the samples with its own conjugate (from the conjugate function 208) to determine the power of the received IQ signals. The last 128 samples of the power $p_0$ to $p_{127}$ are stored in a further shift register 216.

Thus the results of the two autocorrelations (one between $y_t$ and $y_{t-32}$ and another between $y_t$ and $y_{t-16}$) are stored in the respective shift registers 210, 212. These shift registers 210, 212 each store the latest 96 values, i.e. corresponding to the last three periods.

After these two registers 210, 212 get the data, the elements of the registers are summed up using respective sum blocks 218, 220 and the power of the sums are calculated by respective power calculation blocks 222, 224. The power calculation blocks 222, 224 multiply their respective input from the respective sum block 218, 220 by its conjugate to obtain the power.

The calculated powers from the power calculation blocks 222, 224 are each passed to a respective calculate ratio unit (CRU) 226, 228.

Partial sums 230a-c of the samples of the power in the respective shift register 216 are calculated. A first 230a calculates a partial sum of the most recent 96 samples of the power. A second 230b calculates a partial sum of the power 16 samples ago and the 95 preceding samples (i.e. corresponding to half a period ago and the 95 samples preceding it). A third 230c calculates a partial sum of the power 32 samples ago and the 95 preceding samples (i.e. corresponding to a full period ago and the 95 samples preceding it).

The first CRU 226 divides the power from the first power calculation block 222 (i.e. corresponding to the power of the autocorrelation of the IQ signal with the samples from one period ago) by the product of the outputs put of the first partial sum 230a (i.e. the sum of the powers of the $0^{th}$ to $95^{th}$ most recent samples) and the third partial sum 230c (i.e. the sum of the powers of the $32^{nd}$ to $127^{th}$ most recent samples).

The second CRU 228 divides the power from the second power calculation block 224 (i.e. corresponding to the power of the autocorrelation of the IQ signal with the samples from half a period ago) by the product of the outputs put of the second partial sum 230a (i.e. the sum of the powers of the $16^{th}$ to $111^{th}$ most recent samples) and the third partial sum 230c (i.e. the sum of the powers of the $32^{nd}$ to $127^{th}$ most recent samples).

Finally, the output of the second CRU 228 is subtracted from the output of the first CRU 226 using a summation block 232 to produce an output signal x.

Figure 8:
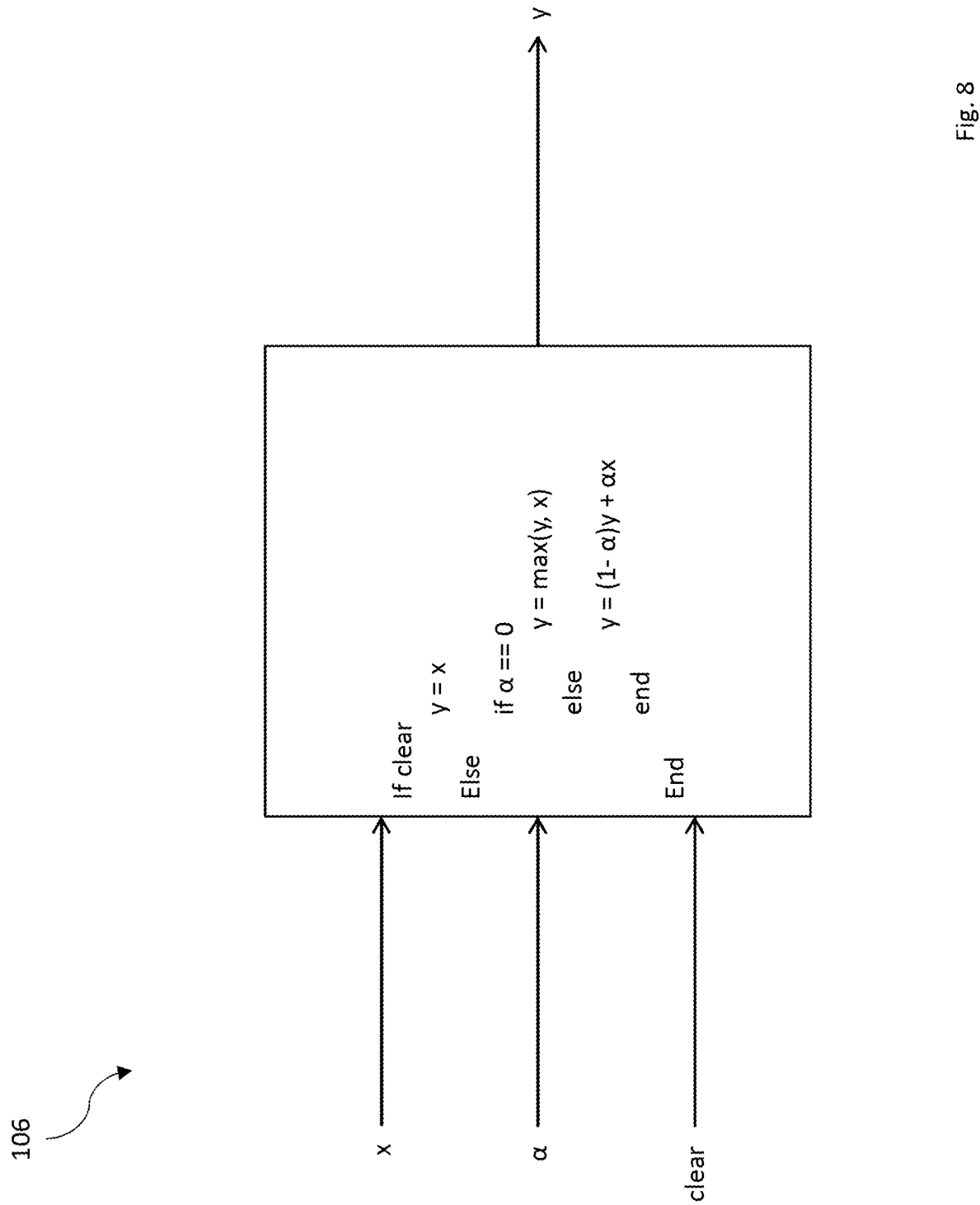
FIG. 8 is a block diagram of the filter of FIG. 6.

FIG. 8 is a block diagram of the filter 106 of FIG. 6. The filter 106 is arranged to receive the output signal x from the core 104, and produce a filtered output signal y. The filter 106 is also configured to receive a 'clear' signal, which acts to reset the filter 106. If the clear signal is set, the filter output y is set equal to the input signal x from the core 104.

The filter 106 follows a particular filter algorithm, making use of a dampening factor $\alpha$ of the moving average filter which used on the correlator output. If the clear signal is asserted, the filter output y is set equal to the input signal x from the core 104 as above. If, however, the clear signal is not set, a further condition is checked.

If the dampening factor $\alpha$ is zero, the filter output y is set highest of itself and the input signal x from the core 104, or in other words y is set to the value of the input signal x if x is higher than y, i.e. y=max(y, x).

Otherwise, if the dampening factor $\alpha$ is non-zero, the filter output y is set to be the sum of $(1-\alpha)*y$ and $\alpha*x$, i.e. $y=(1-\alpha)y+\alpha x$.

Figure 9:
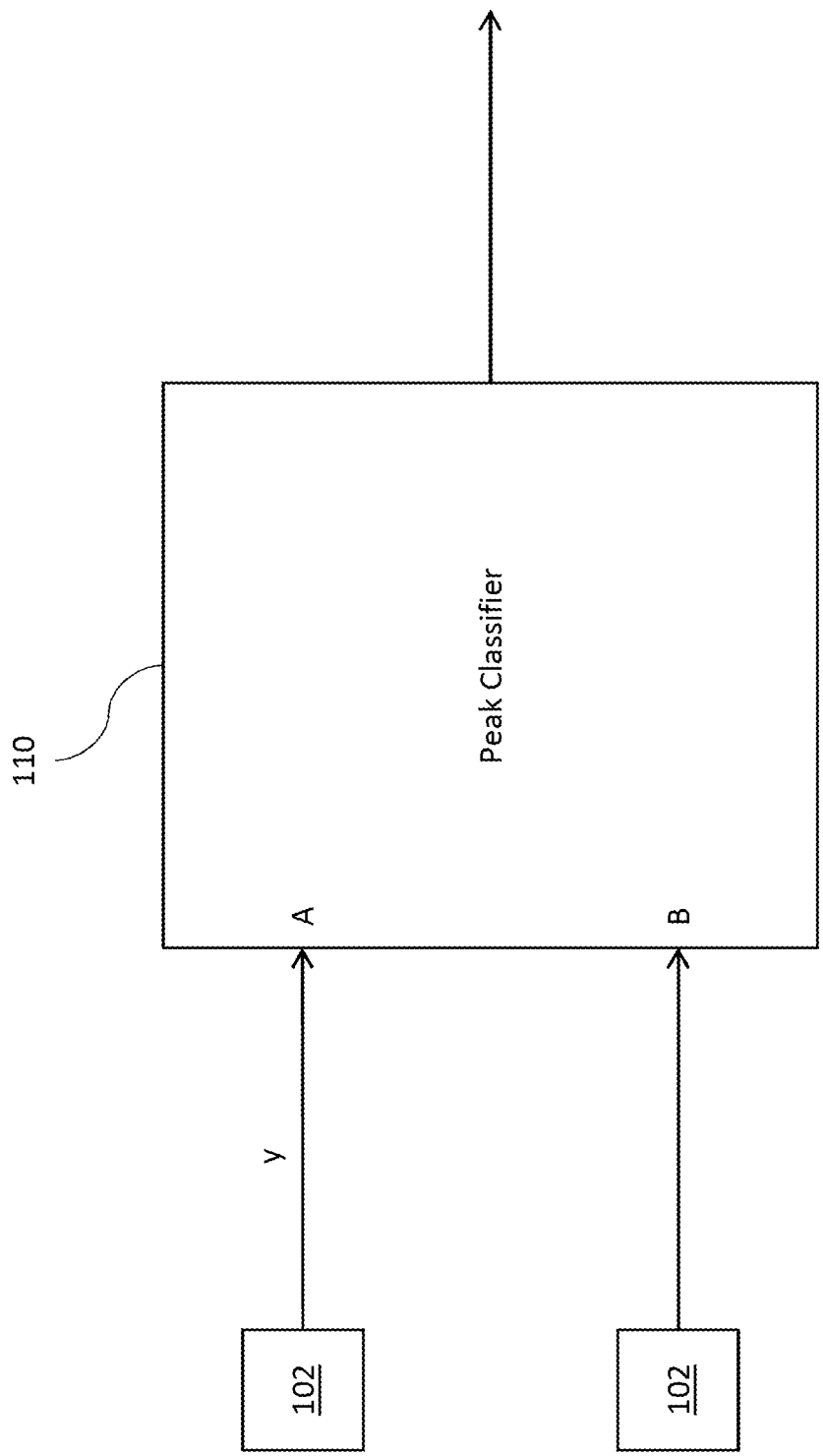
FIG. 9 is a block diagram of the peak classifier in the device of FIG. 5.

FIG. 9 is a block diagram of the peak classifier 110 in the device 100 of FIG. 5. The peak classifier 110 is a decision maker and is configured to evaluate the quality of the peak chain detected by the DBC 108 (which is supplied to input B), with the assistance of the output y from the preamble recognition module 102 (which is supplied to input A). The peak classifier 110 handles two kinds of peaks.

Firstly, if both A (i.e. the output y from the preamble recognition module 102) and B (i.e. the DBC 108 peak strength) are larger than respective thresholds C and D, the peak classifier 110 regards the event as a strong peak detection. In this case, the peak classifier 110 starts (or restarts) the first data processing block 112a and passes the new values of the peak strength and the output y from the preamble recognition module 102 to the block to update the thresholds C, D.

Secondly, if the B is not larger than the threshold D or the A is not larger than the threshold C, but they are still larger than the configured lower bounds, the peak classifier 110 regards the event as a weak peak detection. In this case, the peak classifier 110 sends a trigger signal to all blocks to decay their thresholds accordingly. The lower bounds may be set via a configurable register (not shown).

Figure 10:
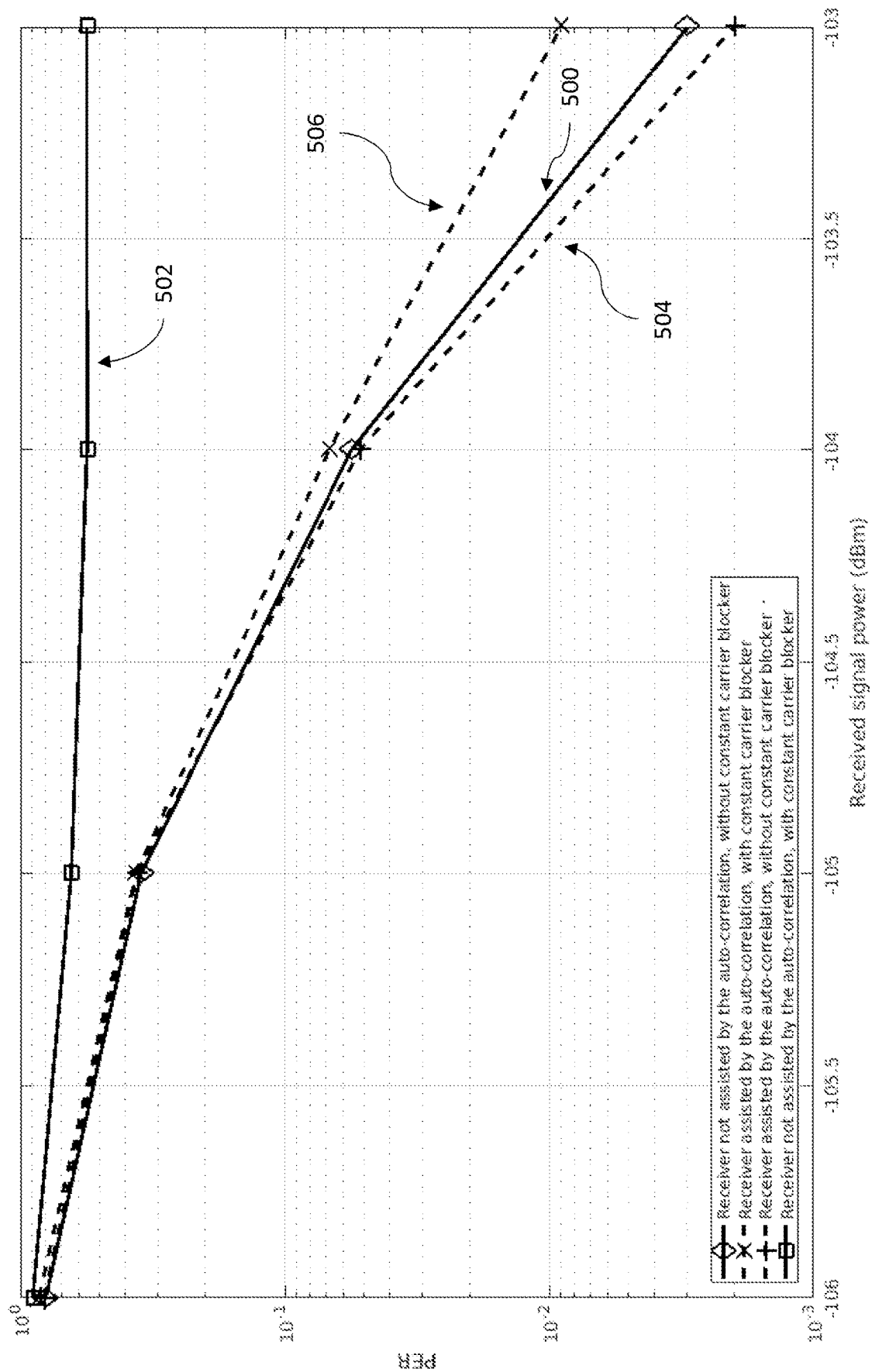
FIG. 10 is a plot showing a packet error rate (PER) comparison when the constant carrier is disabled and enabled, with and without the use of an embodiment of the present invention.

FIG. 10 is a simulated plot showing a packet error rate (PER) comparison when the constant carrier is disabled and enabled, both with and without use of an embodiment of the present invention. Specifically, FIG. 10 shows the comparative PER curves when the constant carrier blocker is disabled and enabled of a conventional BLE LR receiver shown by plots 500 and 502 and one operating in accordance with an embodiment of the present invention shown by plots 504 and 506 (i.e. having the preamble recognition module).

Specifically, plot 500 shows a conventional receiver with the constant carrier disabled; plot 502 shows a conventional receiver with the constant carrier enabled; plot 504 shows a receiver in accordance with an embodiment of the present invention with the constant carrier disabled; and plot 506 shows a receiver in accordance with an embodiment of the present invention with the constant carrier enabled.

It can be seen that when the constant carrier is enabled, the conventional BLE receiver suffers a significant reduction in performance, as evidenced by the much higher PER of plot 502 compared to plot 500. Comparatively, with the constant carrier enabled, the performance of the BLE LR receiver of the present invention follows more closely the performance of the conventional receiver without the constant carrier, as evidenced by comparing plot 506 to plots 500. This shows a significant improvement over the performance of the conventional receiver under constant carrier conditions, as shown by comparing plots 506 and 502.

Even with the constant carrier disabled, the BLE LR receiver of the present invention provides improved performance compared to the conventional receiver, as shown by a comparison of plots 504 and 500 respectively.

It can be seen from FIG. 10 that the BLE LR receiver of the present invention is significantly more robust to constant carrier conditions than a conventional receiver.

While specific embodiments of the present invention have been described in detail, it will be appreciated by those skilled in the art that the embodiments described in detail are not limiting on the scope of the claimed invention.

The invention claimed is:

1. A radio receiver device configured to receive a digital radio signal and to determine whether said digital radio signal includes a predetermined cyclic preamble having a period, the radio receiver device comprising:
   an input portion configured to sample the received digital radio signal and to generate therefrom a plurality of samples;
   a buffer configured to store the plurality of samples;
   a first autocorrelator configured to correlate a first subset of the plurality of samples with a second subset of the plurality of samples to generate a first correlation metric, said second subset of samples having been stored in the buffer earlier than said first subset of samples by a first delay equal to an even integer multiple of half of the preamble period;
   a second autocorrelator configured to correlate the first subset of the plurality of samples with a third subset of the plurality of samples to generate a second correlation metric, said third subset of samples having been stored in the buffer earlier than said first subset of samples by a second delay equal to an odd integer multiple of half of the preamble period; and
   a processing portion configured to calculate a difference between the first and second correlation metrics and to determine that the radio signal includes the predetermined cyclic preamble when said difference is greater than a threshold value.

2. The radio receiver device of claim 1, wherein a first half of the predetermined cyclic preamble is the inverse of a second half of the predetermined cyclic preamble.

3. The radio receiver device of claim 1, wherein the predetermined cyclic preamble is [00111100].

4. The radio receiver device of claim 1, configured to operate in accordance with a Bluetooth Low Energy protocol.

5. The radio receiver device of claim 1, further comprising a demodulator, said device being configured to enable the demodulator only when the processing portion determines that the digital radio signal comprises the predetermined cyclic preamble.

6. The radio receiver device of claim 1, further comprising a low-pass filter, said low-pass filter being configured to filter the difference before the determination of whether the digital radio signal comprises the predetermined cyclic preamble is made.

7. The radio receiver device of claim 1, configured to increase the threshold value once synchronization has been performed.

8. The radio receiver device of claim 7, wherein the threshold value is increased to a value dependent on the difference calculated by the processing portion for the received radio signal for which synchronization was performed.

9. The radio receiver device of claim 1, wherein the processing portion is configured to:
   determine a respective power of each of the first, second, and third subsets;
   determine a respective power of an output of each of the first and second autocorrelators;
   divide the power of the output of the first autocorrelator by the product of the respective powers of the first and second subsets to generate a first ratio; and
   divide the power of the output of the second autocorrelator by the product of the respective powers of the first and third subsets to generate a second ratio.

10. The radio receiver device of claim 9, wherein the first and second correlation metrics are derived from the first and second ratios respectively.

11. The radio receiver device of claim 10, wherein the first and second correlation metrics are the first and second ratios respectively.

12. A method of determining whether a received digital radio signal includes a predetermined cyclic preamble having a period, the method comprising:
   receiving a digital radio signal;
   sampling the received digital radio signal to generate therefrom a plurality of samples;
   storing the plurality of samples;
   autocorrelating a first subset of the plurality of samples with a second subset of the plurality of samples to generate a first correlation metric, said second subset of samples having been stored earlier than said first subset of samples by a first delay equal to an even integer multiple of half of the preamble period;
   autocorrelating the first subset of the plurality of samples with a third subset of the plurality of samples to generate a second correlation metric, said third subset of samples having been stored earlier than said first subset of samples by a second delay equal to an odd integer multiple of half of the preamble period;
   calculating a difference between the first and second correlation metrics; and
   determining that the radio signal includes the predetermined cyclic preamble when said difference is greater than a threshold value.

13. The method of claim 12, wherein a first half of the predetermined cyclic preamble is the inverse of a second half of the predetermined cyclic preamble.

14. The method of claim 12, wherein the predetermined cyclic preamble is [00111100].

15. The method of claim 12, comprising operating in accordance with a Bluetooth Low Energy protocol.

16. The method of claim 12, enabling a demodulator only when it is determined that the digital radio signal comprises the predetermined cyclic preamble.

17. The method of claim 12, further comprising low-pass filtering the difference before the determination of whether the digital radio signal comprises the predetermined cyclic preamble is made.

18. The method of claim 12, comprising increasing the threshold value once synchronization has been performed.

19. The method of claim 12, further comprising:
   determining a respective power of each of the first, second, and third subsets;
   determining a respective power of an output of each of the first and second autocorrelation steps;
   dividing the power of the output of the first autocorrelation step by the product of the respective powers of the first and second subsets to generate a first ratio; and
   dividing the power of the output of the second autocorrelation step by the product of the respective powers of the first and third subsets to generate a second ratio,
   wherein the first correlation metric is derived from the first ratio, and wherein the second correlation metric is derived from the second ratio.

20. A non-transitory computer-readable medium comprising instructions that, when executed by a processor, cause the processor to determine whether a sampled received digital radio signal, comprising a plurality of stored samples, includes a predetermined cyclic preamble having a period, by:
   autocorrelating a first subset of the plurality of stored samples with a second subset of the plurality of samples to generate a first correlation metric, said second subset of samples having been stored earlier than said first subset of samples by a first delay equal to an even integer multiple of half of the preamble period;
   autocorrelating the first subset of the plurality of stored samples with a third subset of the plurality of samples to generate a second correlation metric, said third subset of samples having been stored earlier than said first subset of samples by a second delay equal to an odd integer multiple of half of the preamble period;
   calculating a difference between the first and second correlation metrics; and
   determining that the radio signal includes the predetermined cyclic preamble when said difference is greater than a threshold value.

\* \* \* \* \*